United States Patent
Seo et al.

(10) Patent No.: US 12,460,336 B2
(45) Date of Patent: Nov. 4, 2025

(54) SYSTEMS AND METHODS FOR USING ARTIFICIAL INTELLIGENCE TO PERFORM A BULK FLUSH PROCESS IN A WASHING MACHINE APPLIANCE

(71) Applicant: Haier US Appliance Solutions, Inc., Wilmington, DE (US)

(72) Inventors: Wonmyung Seo, Seongnam (KR); Seong Hoon Ryu, Suwon (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 447 days.

(21) Appl. No.: 17/962,903

(22) Filed: Oct. 10, 2022

(65) Prior Publication Data

US 2024/0117546 A1  Apr. 11, 2024

(51) Int. Cl.
| | | |
|---|---|---|
| *D06F 33/37* | (2020.01) | |
| *D06F 23/04* | (2006.01) | |
| *D06F 33/47* | (2020.01) | |
| *D06F 34/04* | (2020.01) | |
| *D06F 34/22* | (2020.01) | |
| *D06F 34/28* | (2020.01) | |
| *D06F 39/02* | (2006.01) | |
| *D06F 39/08* | (2006.01) | |

(Continued)

(52) U.S. Cl.
CPC .............. *D06F 33/47* (2020.02); *D06F 23/04* (2013.01); *D06F 33/37* (2020.02); *D06F 34/04* (2020.02); *D06F 34/22* (2020.02); *D06F 34/28* (2020.02); *D06F 39/022* (2013.01); *D06F 39/088* (2013.01); *G06V 10/82* (2022.01); *G06V 20/52* (2022.01); *D06F 2103/22* (2020.02); *D06F 2105/02* (2020.02); *D06F 2105/42* (2020.02); *D06F 2105/58* (2020.02); *H04N 7/183* (2013.01)

(58) Field of Classification Search
None
See application file for complete search history.

(56) References Cited

U.S. PATENT DOCUMENTS

| | | | |
|---|---|---|---|
| 2017/0037559 A1* | 2/2017 | Gallagher | D06F 39/022 |
| 2020/0071871 A1* | 3/2020 | Kim | G06V 10/82 |

(Continued)

FOREIGN PATENT DOCUMENTS

| | | |
|---|---|---|
| CN | 102505413 A | 6/2012 |
| CN | 106930055 A | 7/2017 |

(Continued)

*Primary Examiner* — Cristi J Tate-Sims
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A water supply selectively dispenses a flow of wash fluid and a bulk dispenser selectively adds a wash additive to the flow of wash fluid. A controller is configured to initiate a bulk flush operation by operating the water supply to provide the flow of wash fluid and the bulk dispenser to dispense the wash additive, obtain one or more images of the flow of wash fluid using a camera assembly, analyze the one or more images using an image recognition process to determine an additive content of the flow of wash fluid, and terminate the bulk flush operation in response to determining that the additive content falls below a predetermined additive threshold.

17 Claims, 6 Drawing Sheets

(51) Int. Cl.
*G06V 10/82* (2022.01)
*G06V 20/52* (2022.01)
*D06F 103/22* (2020.01)
*D06F 105/02* (2020.01)
*D06F 105/42* (2020.01)
*D06F 105/58* (2020.01)
*H04N 7/18* (2006.01)

(56) References Cited

U.S. PATENT DOCUMENTS

2021/0025104 A1\*  1/2021  Ha ............................ G06T 7/60
2023/0067550 A1\*  3/2023  Yoon ....................... D06F 34/22

FOREIGN PATENT DOCUMENTS

CN    110735284 A    1/2020
CN    106676824 B    10/2021

\* cited by examiner

SYSTEMS AND METHODS FOR USING ARTIFICIAL INTELLIGENCE TO PERFORM A BULK FLUSH PROCESS IN A WASHING MACHINE APPLIANCE

FIELD OF THE INVENTION

The present subject matter relates generally to washing machine appliances, or more specifically, to systems and methods for using image recognition processes to perform bulk dispenser diagnostics in a washing machine appliance.

BACKGROUND OF THE INVENTION

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A wash basket is rotatably mounted within the wash tub and defines a wash chamber for receipt of articles for washing. A drive assembly is coupled to the wash tub and is configured to selectively rotate the wash basket within the wash tub.

Certain conventional washing machine appliances are equipped with a bulk dispensing detergent system that includes a bulk reservoir for storing a large amount of detergent. A detergent dispenser can inject the correct amount of detergent based on the load size, water level, and load type to facilitate a wash operation. The detergent dispenser commonly dispenses the detergent using a venturi effect and detects a low level of detergent in the bulk reservoir using a water level sensor, e.g., such as a conductivity sensor or float sensor.

It may be desirable to periodically flush all of the additive out of a bulk reservoir. For example, when a user wishes to change the type of detergent, e.g., from wash detergent to fabric softener, they may wish to have all of the prior additive removed to prevent mixing with newly added additive. Alternatively, it may be desirable to periodically flush all detergent and clean the bulk reservoir. One method of flushing the bulk reservoir includes operating the water supply for a fixed amount of time, e.g., 30 minutes. However, if the bulk reservoir has a large additive volume remaining or the additive is very viscous, this fixed period of time may be insufficient to flush all of the detergent. By contrast, if the bulk reservoir has a low volume of additive remaining, the fixed flush time may result in wasted water, time, and energy.

Accordingly, an improved bulk detergent dispenser for a washing machine appliance is desirable. More specifically, a method for efficiently flushing a bulk reservoir would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving a load of clothes, a water supply configured to selectively dispense a flow of wash fluid through a discharge nozzle into the wash tub, a bulk dispenser for selectively adding a wash additive to the flow of wash fluid, and a controller operably coupled to the water supply, the bulk dispenser, and a camera assembly. The controller is configured to initiate a bulk flush operation by operating the water supply to provide the flow of wash fluid and the bulk dispenser to dispense the wash additive, obtain one or more images of the flow of wash fluid using the camera assembly, analyze the one or more images using an image recognition process to determine an additive content of the flow of wash fluid, determine that the additive content falls below a predetermined additive threshold, and terminate the bulk flush operation in response to determining that the additive content falls below the predetermined additive threshold.

In another exemplary embodiment, a method of operating a washing machine appliance is provided. The washing machine appliance includes a wash basket rotatably mounted within a wash tub and defining a wash chamber configured for receiving a load of clothes, a water supply configured to selectively dispense a flow of wash fluid through a discharge nozzle into the wash tub, and a bulk dispenser for selectively adding a wash additive to the flow of wash fluid. The method includes initiating a bulk flush operation by operating the water supply to provide the flow of wash fluid and the bulk dispenser to dispense the wash additive, obtaining one or more images of the flow of wash fluid using a camera assembly, analyzing the one or more images using an image recognition process to determine an additive content of the flow of wash fluid, determining that the additive content falls below a predetermined additive threshold, and terminating the bulk flush operation in response to determining that the additive content falls below the predetermined additive threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
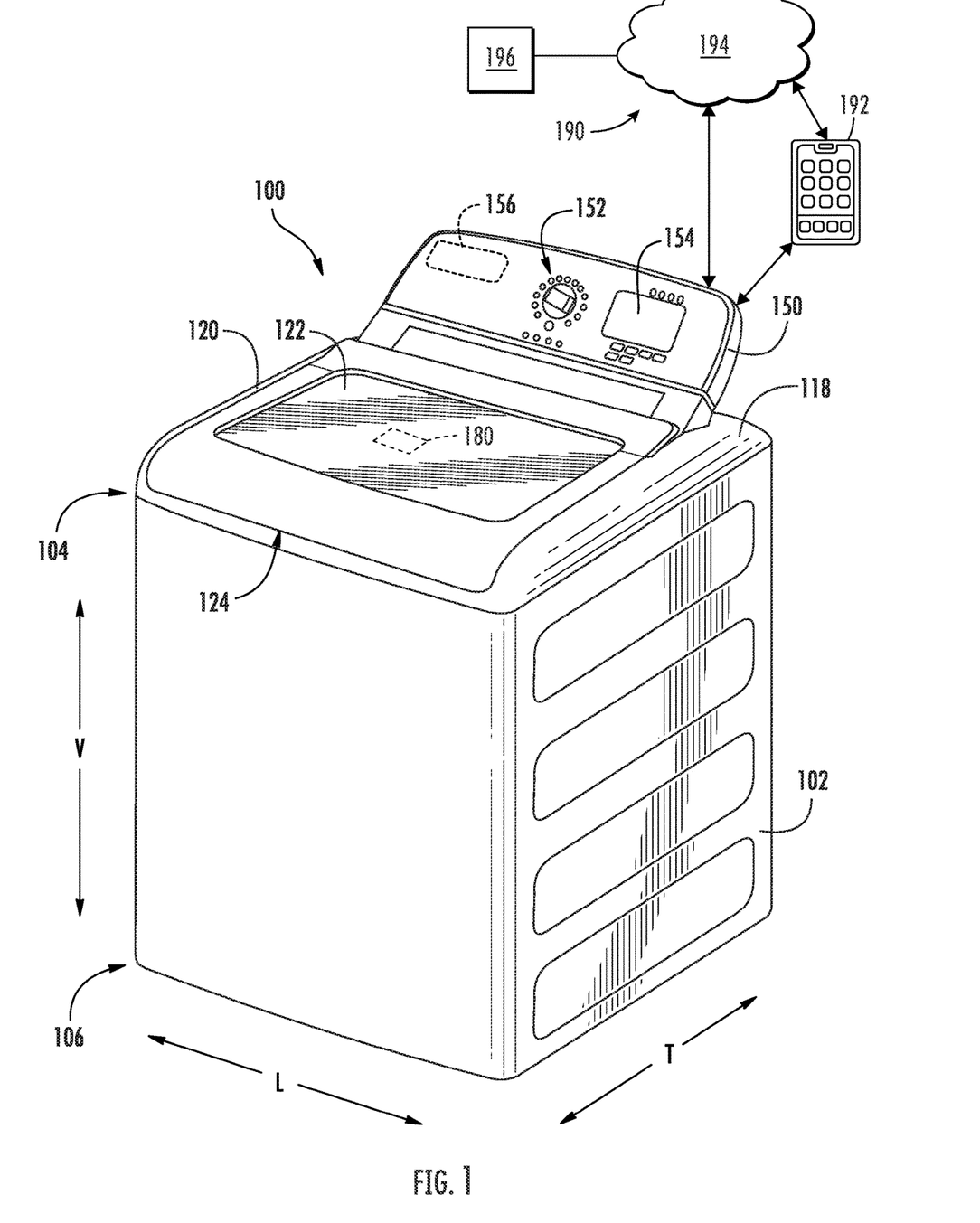
FIG. 1 provides a perspective view of a washing machine appliance according to an exemplary embodiment of the present subject matter with a door of the exemplary washing machine appliance shown in a closed position.
Figure 2:
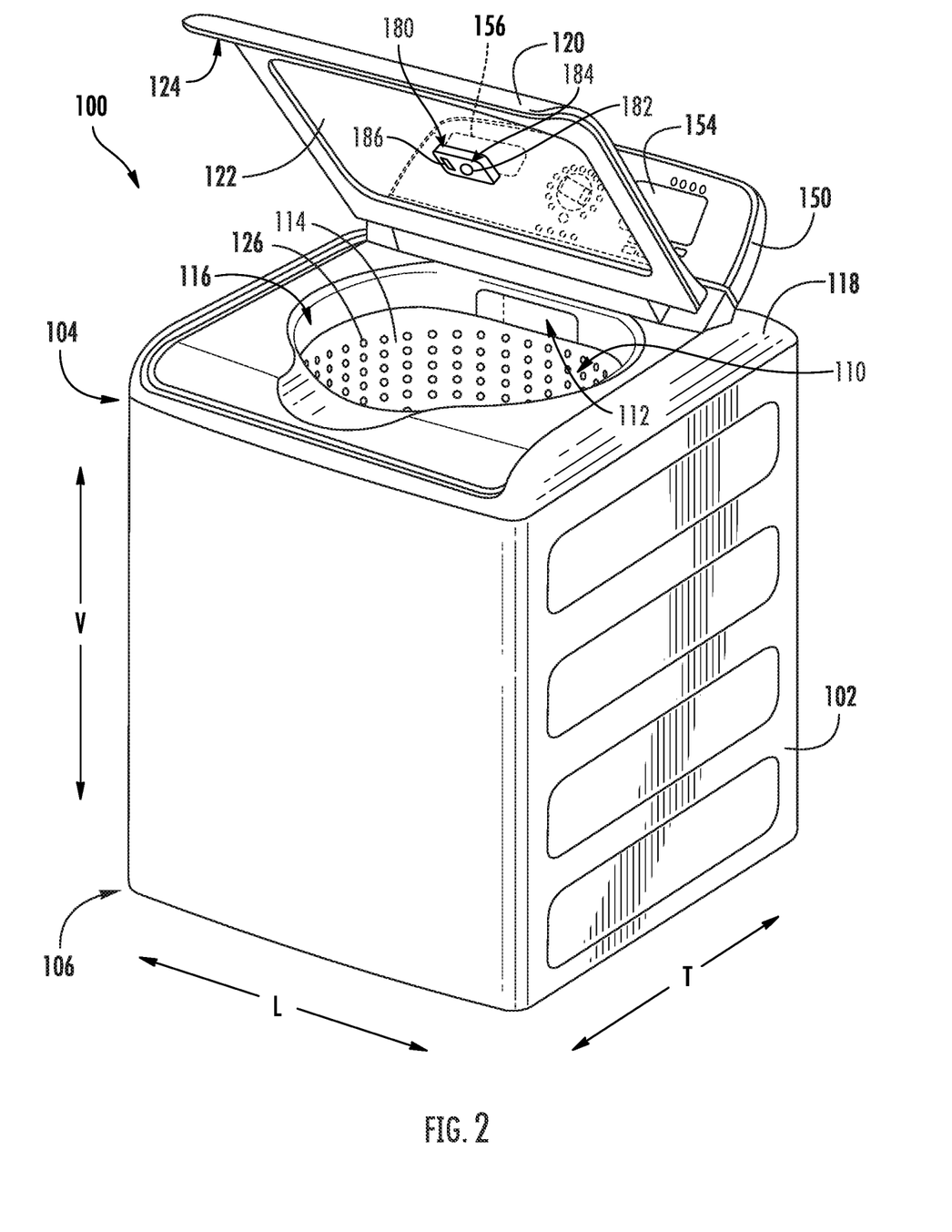
FIG. 2 provides a perspective view of the exemplary washing machine appliance of FIG. 1 with the door of the exemplary washing machine appliance shown in an open position.
Figure 3:
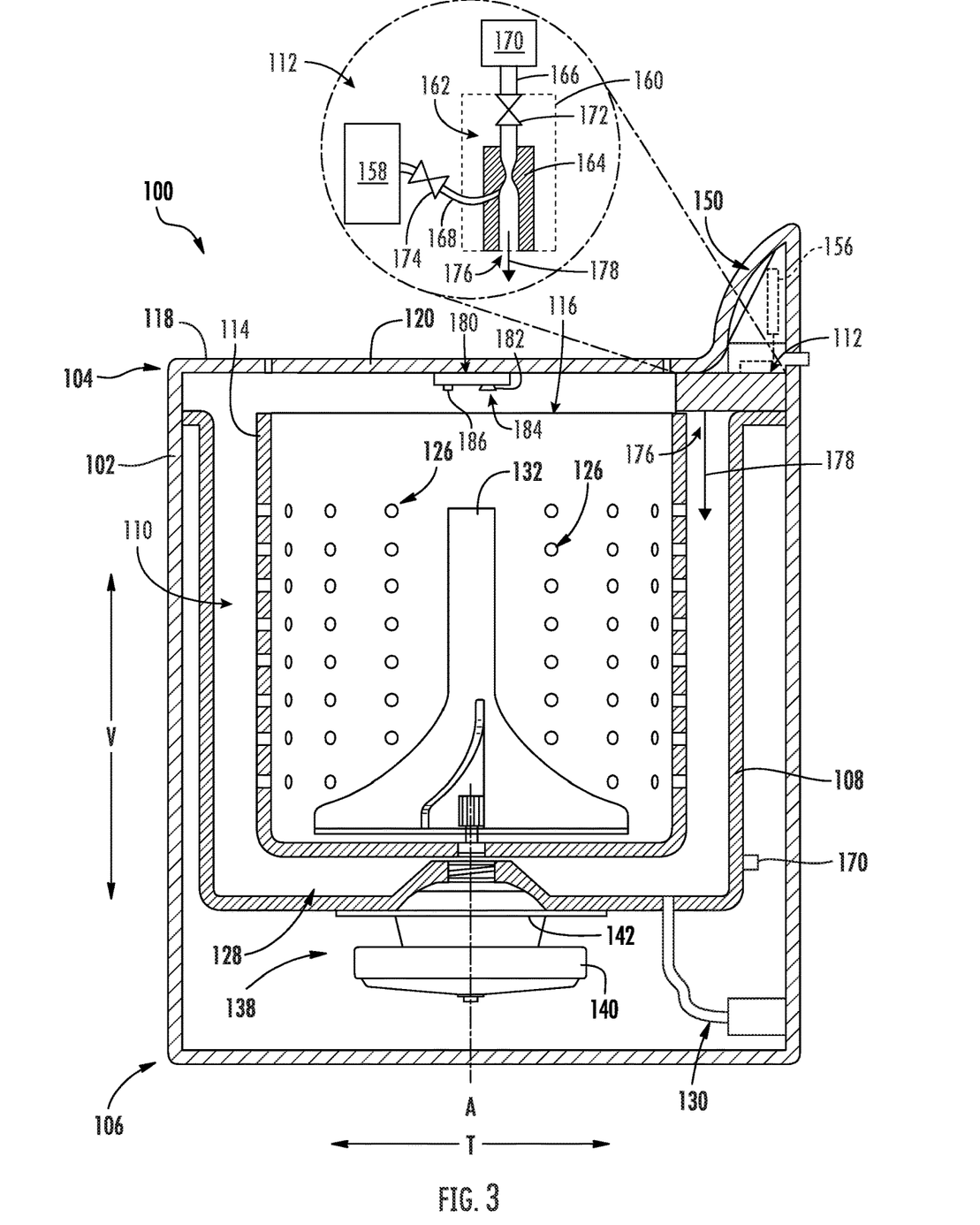
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser or dispensing assembly 112 (FIG. 2) for dispensing wash fluid into wash tub 108.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

Referring again to FIGS. 2 and 3, dispensing assembly 112 of washing machine appliance 100 will be described in more detail. As explained briefly above, dispensing assembly 112 may generally be configured to dispense wash fluid to facilitate one or more operating cycles or phases of an operating cycle (e.g., such as a wash cycle or a rinse cycle). The terms "wash fluid" and the like may be used herein to generally refer to a liquid used for washing and/or rinsing clothing or other articles. For example, the wash fluid is typically made up of water that may include other additives such as detergent, fabric softener, bleach, or other suitable treatments (including combinations thereof). More specifically, the wash fluid for a wash cycle may be a mixture of water, detergent, and/or other additives, while the wash fluid for a rinse cycle may be water only.

As best shown schematically in FIG. 3, dispensing assembly 112 may generally include a bulk storage tank or bulk reservoir 158 and a dispenser box 160. More specifically, bulk reservoir 158 may be positioned under top panel 118 and defines an additive reservoir for receiving and storing wash additive. More specifically, according to the illustrated embodiment, bulk reservoir 158 may contain a bulk volume of wash additive (such as detergent or other suitable wash additives) that is sufficient for a plurality of wash cycles of washing machine appliance 100, such as no less than twenty wash cycles, no less than fifty wash cycles, etc. As a particular example, bulk reservoir 158 is configured for containing no less than twenty fluid ounces, no less than three-quarters of a gallon, or about one gallon of wash additive.

As will be described in detail below, dispensing assembly 112 may include features for drawing wash additive from bulk reservoir 158 and mixing it with water prior to directing the mixture into wash tub 108 to facilitate a cleaning operation. By contrast, dispensing assembly 112 is also capable of dispensing water only. Thus, dispensing assembly 112 may automatically dispense the desired amount of water with or without a desired amount of wash additive such that a user can avoid filling dispenser box 160 with detergent before each operation of washing machine appliance 100.

For example, as best shown in FIG. 3, washing machine appliance 100 includes an aspirator assembly 162, which is a Venturi-based dispensing system that uses a flow of water to create suction within a Venturi tube to draw in wash additive from bulk reservoir 158 which mixes with the water and is dispensed into wash tub 108 as a concentrated wash fluid preferably having a target volume of wash additive. After the target volume of wash additive is dispensed into wash tub 108, additional water may be provided into wash tub 108 as needed to fill to the desired wash volume. It should be appreciated that the target volume may be pre-programmed in controller 156 according to the selected operating cycle or parameters, may be set by a user, or may be determined in any other suitable manner.

As illustrated, aspirator assembly 162 includes a Venturi pump 164 that is fluidly coupled to both a water supply conduit 166 and a suction line 168. As illustrated, water supply conduit 166 may provide fluid communication between a water supply source 170 (such as a municipal water supply) and a water inlet of Venturi pump 164. In addition, washing machine appliance 100 includes a water fill valve or water control valve 172 which is operably coupled to water supply conduit 166 and is communicatively coupled to controller 156. In this manner, controller 156 may regulate the operation of water control valve 172 to regulate the amount of water that passes through aspirator assembly 162 and into wash tub 108.

In addition, suction line 168 may provide fluid communication between bulk reservoir 158 and Venturi pump 164 (e.g., via a suction port defined on Venturi pump 164). Notably, as a flow of water is supplied through Venturi pump 164 to wash tub 108, the flowing water creates a negative pressure within suction line 168. This negative pressure may draw in wash additive from bulk reservoir 158. When certain conditions exist, the amount of wash additive dispensed is roughly proportional to the amount of time water is flowing through Venturi pump 164.

Referring still to FIG. 3, aspirator assembly 162 may further include a suction valve 174 that is operably coupled to suction line 168 to control the flow of wash additive through suction line 168 when desired. For example, suction valve 174 may be a solenoid valve that is communicatively coupled with controller 156. Controller 156 may selectively open and close suction valve 174 to allow wash additive to flow from bulk reservoir 158 through additive suction valve 174. For example, during a rinse cycle where only water is desired, suction valve 174 may be closed to prevent wash additive from being dispensed through suction valve 174. In some embodiments, suction valve 174 is selectively controlled based on at least one of the selected wash cycle, the soil level of the articles to be washed, and the article type. According to still other embodiments, no suction valve 174 is needed at all and alternative means for preventing the flow of wash additive may be used or other water regulating valves may be used to provide water into wash tub 108.

Washing machine appliance 100, or more particularly, dispensing assembly 112, generally includes a discharge nozzle 176 for directing a flow of wash fluid (e.g., identified herein generally by reference numeral 178) into wash chamber 108. In this regard, discharge nozzle 176 may be positioned above wash tub proximate a rear of opening 116 defined through top panel 118. Dispensing assembly 112 may be regulated by controller 156 to discharge wash fluid 178 through discharge nozzle 176 at the desired flow rates, volumes, and/or detergent concentrations to facilitate various operating cycles, e.g., such as wash or rinse cycles.

Although water supply conduit 166, water supply source 170, discharge nozzle 176, and water control valve 172 are all described and illustrated herein in the singular form, it should be appreciated that these terms may be used herein generally to describe a supply plumbing for providing hot and/or cold water into wash chamber 110. In this regard, water supply conduit 166 may include separate conduits for receiving hot and cold water, respectively. Similarly, water supply source 170 may include both hot- and cold-water supplies regulated by dedicated valves. In addition, washing machine appliance 100 may include one or more pressure sensors (not shown) for detecting the amount of water and or clothes within wash tub 108. For example, the pressure sensor may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 138 may operate to discharge wash fluid from wash tub 108, e.g., to an external drain. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. Specifically, camera 182 is mounted such that is faces toward a bottom side of wash tub 108. In this manner, camera 182 can take unobstructed images or video of an inside of wash chamber 110, e.g., including images of wash basket 114 and discharge nozzle 176.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos within wash chamber 110, as described in more detail below. It should be appreciated that other locations for mounting camera assembly 180 are possible, such as below or adjacent a discharge nozzle 176 of washing machine appliance 100.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes or the flow of wash fluid. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to determine the level of water or wash fluid within wash chamber 110, the additive content of the flow of wash fluid 178, or other cycle information, and may use this information to make informed decisions regarding the operation of washing machine appliance 100.

Referring still to FIG. 1, a schematic diagram of an external communication system 190 will be described according to an exemplary embodiment of the present subject matter. In general, external communication system 190 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 190 may be used to transfer data or other information to improve performance of one or more external devices or appliances and/or improve user interaction with such devices.

For example, external communication system 190 permits controller 156 of washing machine appliance 100 to communicate with a separate device external to washing machine appliance 100, referred to generally herein as an external device 192. As described in more detail below, these communications may be facilitated using a wired or wireless connection, such as via a network 194. In general, external device 192 may be any suitable device separate from washing machine appliance 100 that is configured to provide and/or receive communications, information, data, or commands from a user. In this regard, external device 192 may be, for example, a personal phone, a smartphone, a tablet, a laptop or personal computer, a wearable device, a smart home system, or another mobile or remote device.

In addition, a remote server 196 may be in communication with washing machine appliance 100 and/or external device 192 through network 194. In this regard, for example, remote server 196 may be a cloud-based server 196, and is thus located at a distant location, such as in a separate state, country, etc. According to an exemplary embodiment, external device 192 may communicate with a remote server 196 over network 194, such as the Internet, to transmit/receive data or information, provide user inputs, receive user notifications or instructions, interact with or control washing machine appliance 100, etc. In addition, external device 192 and remote server 196 may communicate with washing machine appliance 100 to communicate similar information.

In general, communication between washing machine appliance 100, external device 192, remote server 196, and/or other user devices or appliances may be carried using any type of wired or wireless connection and using any suitable type of communication network, non-limiting examples of which are provided below. For example, external device 192 may be in direct or indirect communication with washing machine appliance 100 through any suitable wired or wireless communication connections or interfaces, such as network 194. For example, network 194 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
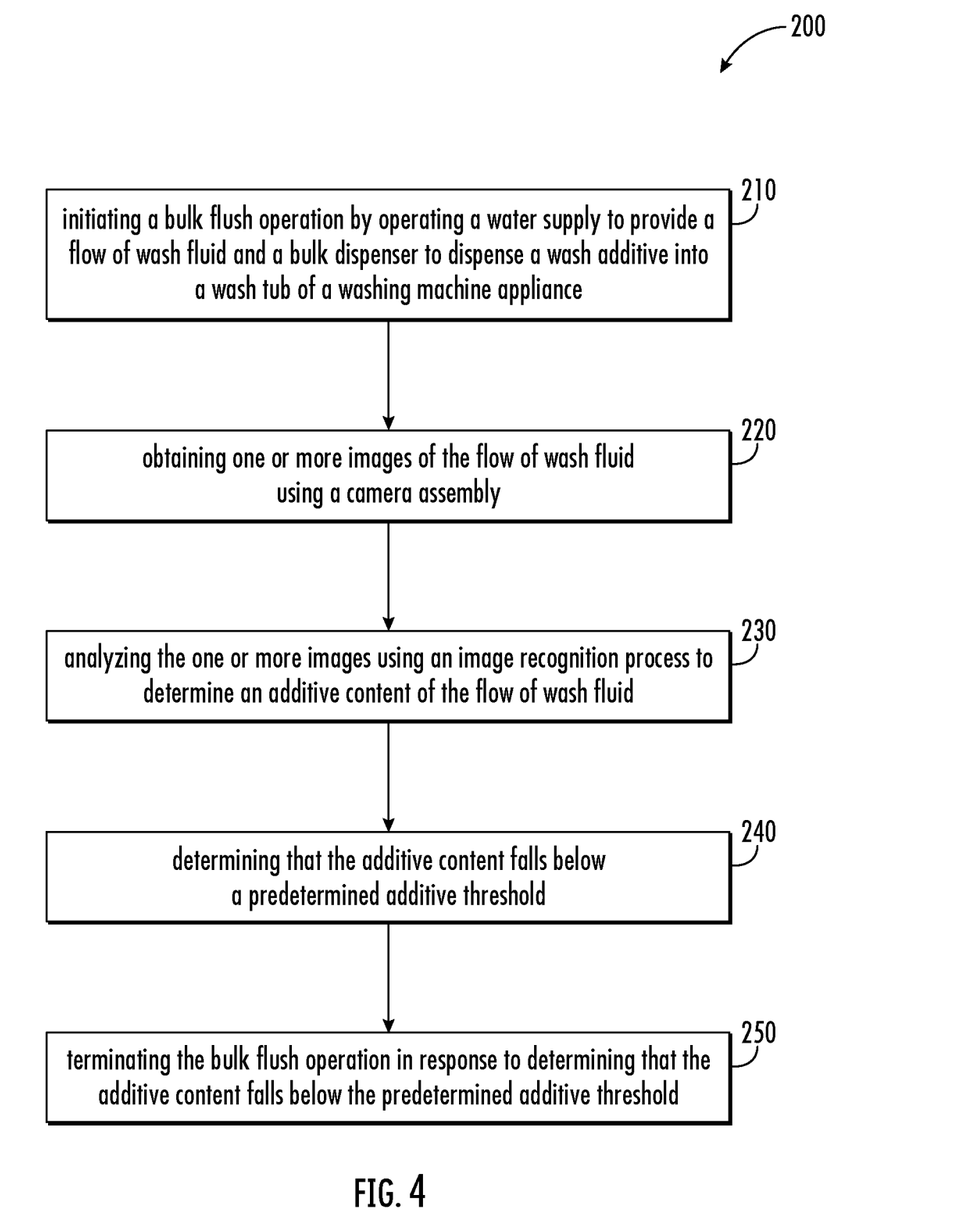
FIG. 4 illustrates a method for operating a washing machine appliance in accordance with one embodiment of the present disclosure.

Referring now to FIG. 4, method 200 includes, at step 210, initiating a bulk flush operation by operating a water supply to provide a flow of wash fluid and operating a bulk dispenser to dispense a wash additive into wash tub of a washing machine appliance. In this regard, continuing the example from above, washing machine appliance 100 may include water supply source 170 and water control valve 172 that operate as a water supply to regulate a flow of wash fluid 178 into wash tub 108 through discharge nozzle 176. In addition, washing machine appliance 100 may include bulk reservoir 178 and suction valve 174 that operate as a bulk dispenser for selectively injecting or permitting the flow of wash additive into wash fluid 178. Controller 156 may be in operative communication with water control valve 172 and suction valve 174 to control the bulk flush operation.

In general, the bulk flush operation may include providing a flow of wash fluid while injecting wash additive, e.g., to drain the wash additive from bulk reservoir 158. For example, it may be desirable to drain the wash additive when a user wishes to replace the additive or when the reservoir needs to be cleaned. As explained above, conventional methods for draining the bulk reservoir may include operating the water supply and bulk dispenser for a fixed amount of time. However, such a fixed flush time may result in incomplete discharge of wash additive, e.g., when the bulk reservoir contains a large volume of additive or the additive has a particularly high viscosity. By contrast, if the bulk reservoir is close to empty, the fixed flush time may result in wasted time, energy, and water. Accordingly, aspects of the present subject matter are directed to methods for improving the bulk flush operation.

For example, method 200 may further include, at step 220, obtaining one or more images of the flow of wash fluid using a camera assembly. In this regard, controller 156 of washing machine appliance 100 may be in operative communication with camera assembly 180 of washing machine appliance 100. According to still other embodiments, the one or more images may be obtained via an external camera, such as a camera located on external device 192 (e.g., on a user's mobile phone). The discussion below may refer to obtaining the one or more images from camera assembly 180. However, it should be appreciated that the present subject matter is not so limited and that the one or more images may be obtained from any other suitable source.

Figure 5:
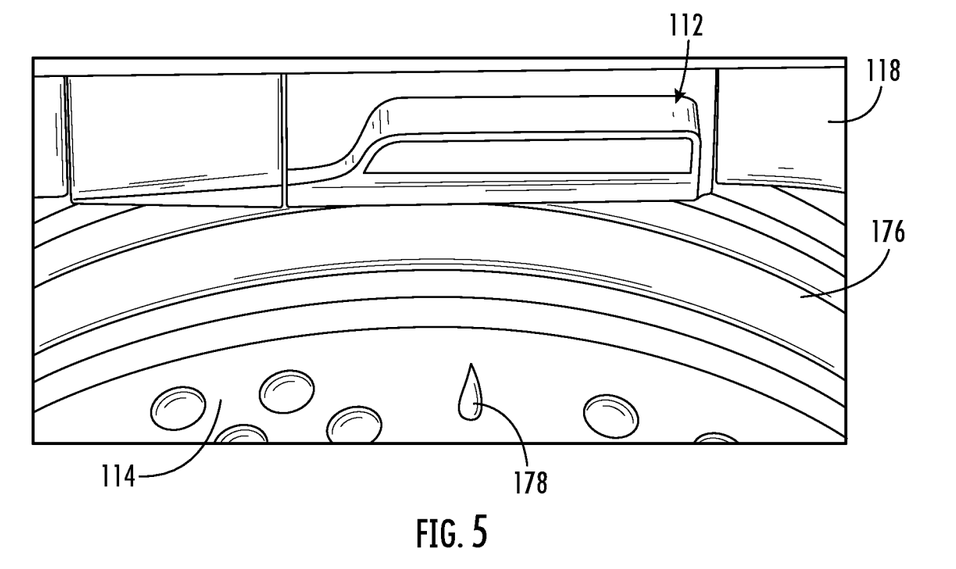
FIG. 5 provides an image captured by a camera assembly of the exemplary washing machine appliance of FIG. 1 while a dispensing assembly is not dispensing wash fluid according to an exemplary embodiment of the present disclosure.
Figure 6:
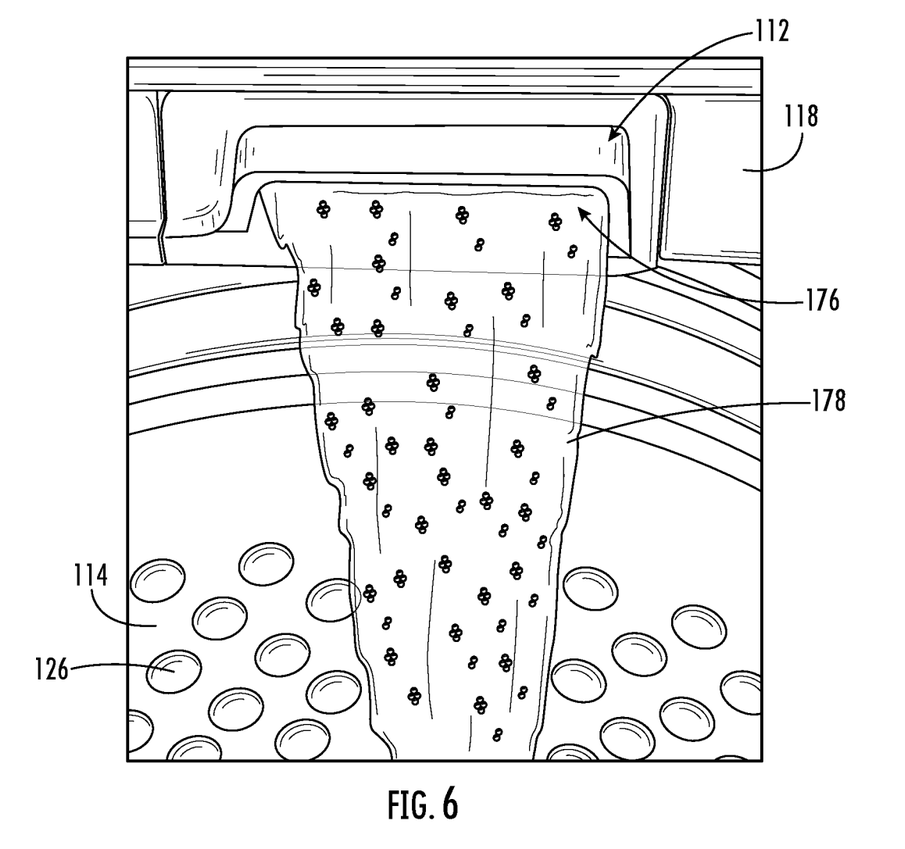
FIG. 6 provides an image captured by a camera assembly of the exemplary washing machine appliance of FIG. 1 while a dispensing assembly is dispensing wash fluid with detergent according to an exemplary embodiment of the present disclosure.
Figure 7:
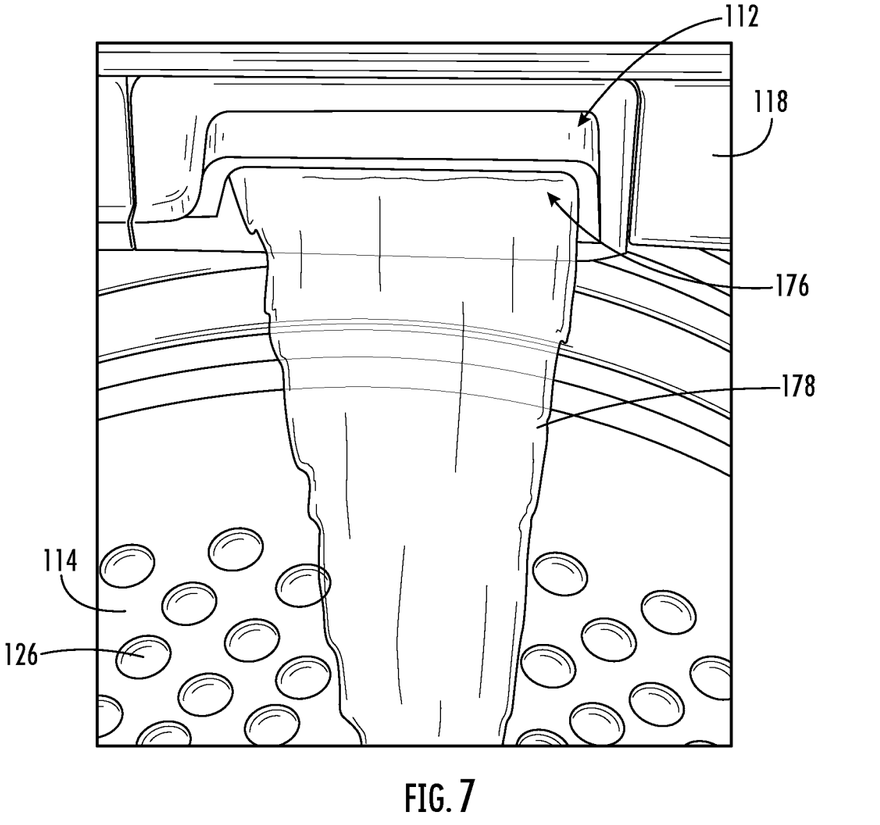
FIG. 7 provides an image captured by the camera assembly of the exemplary washing machine appliance of FIG. 1 while the dispensing assembly is dispensing wash fluid without detergent according to an exemplary embodiment of the present disclosure.

According to exemplary embodiments, camera 182 of camera assembly 180 may be oriented such that it has a field of view that encompasses the flow of wash fluid 178 as dispensed from discharge nozzle 176, e.g., such as the field of view illustrated in FIGS. 5 through 7. For example, camera 182 may be mounted within cabinet 102 in view of the flow of wash fluid 178, discharge nozzle 176, and/or wash basket 114. As explained in more detail below, these images may be used to determine whether the flow of wash fluid 178 contains detergent or other additives. By identifying the presence or absence of wash additives or wash fluid, method 200 may be used to identify issues with dispensing assembly 112, determine when bulk reservoir 158 is empty, etc.

Thus, step 220 includes obtaining one or more images, a series of frames, a video, or any other visual representation of the flow of wash fluid 178 exiting discharge nozzle 176. For example, camera assembly 180 may obtain a video clip of the flow of wash fluid 178, take a still image from the video clip, or otherwise obtain a still representation or photo from the video clip. It should be appreciated that the images obtained by camera assembly 180 may vary in number, frequency, angle, resolution, detail, etc. in order to improve the clarity of the flow of wash fluid 178. In addition, according to exemplary embodiments, controller 156 may be configured for illuminating the tub using tub light 186 just prior to obtaining images.

Referring still to FIG. 4, method 200 may include, at step 230, analyzing the one or more images using an image recognition process to determine an additive content of the flow of wash fluid. It should be appreciated that any suitable image processing or recognition method may be used to analyze the images obtained at step 220 and facilitate determination of the additive content. In addition, it should be appreciated that this image analysis or processing may be performed locally (e.g., by controller 156) or remotely (e.g., by a remote server).

As used herein, the term "additive content" is generally intended to refer to the presence, absence, or some other quantitative or qualitative characteristics of or related to the amount of detergent and/or other wash additives within flow of wash fluid 178. In this regard, the additive content may indicate that there is no detergent in the wash fluid 178 (e.g., such that only fresh water is being supplied as shown for example in FIG. 7). By contrast, the actual detergent content may indicate that detergent is present within wash fluid 178 (e.g., as shown in FIG. 6) and may further include some information related to the type, quantity, concentration, or other characteristics related to the detergent and/or wash fluid 178. According to still other embodiments, the image analysis may show when little to no wash fluid is flowing (e.g., as shown in FIG. 5). Notably, as explained above, knowledge of the additive content may be useful in identifying when the bulk reservoir 158 is empty or when there are other issues associated with dispensing assembly 112, as described in more detail below.

According to exemplary embodiments of the present subject matter, step 230 of analyzing the one or more images may include analyzing the image(s) of the wash fluid using a neural network classification module and/or a machine learning image recognition process. In this regard, for example, controller 156 may be programmed to implement the machine learning image recognition process that includes a neural network trained with a plurality of images of wash fluid with different detergent concentrations, detergent types, water temperatures, etc. By analyzing the image (s) obtained at step 220 using this machine learning image recognition process, controller 156 may determine or approximate the actual detergent content of the flow of wash fluid 178 all, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken within a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 180 and controller 156 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular region containing wash fluid having bubbles or haziness within the wash fluid. In this regard, a "region proposal" may be regions in an image that could belong to a particular object, such as a particular grouping of detergent bubbles. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 230 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image determine an actual detergent content of the wash fluid. In addition, a K-means algorithm may be used. Other image recognition processes are possible and within the scope of the present subject matter.

It should be appreciated that any other suitable image recognition process may be used while remaining within the scope of the present subject matter. For example, step 230 may include using a deep belief network ("DBN") image recognition process. A DBN image recognition process may generally include stacking many individual unsupervised networks that use each network's hidden layer as the input for the next layer. According to still other embodiments, step 230 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 240 includes determining that the additive content falls below a predetermined additive threshold. In this regard, for example, step 240 may include using the analysis performed at step 230 to determine that no additive is being added and the flow of wash fluid 178 is primarily water, or that the amount of additive being injected is below some predetermined amount. For example, this predetermined additive threshold may correspond to a condition where the bulk reservoir 158 is empty or substantially empty. For example, referring now specifically to FIG. 7, the flow of wash fluid 178 is a substantially clear, including little to no bubbles or opacity that may indicate detergent is present. Accordingly, such an image may be indicative of an empty bulk reservoir 158. This predetermined additive threshold may be determined in any suitable manner. In addition, it should be appreciated that according to exemplary embodiments, an additive threshold may need not be specifically determined, so long as the analysis of the image results in a determination that wash additive is no longer being added to the flow of wash fluid.

Step 250 may include terminating the bulk flush operation in response to determining that the additive content falls below the predetermined additive threshold. In this regard, when the additive content falls below the predetermined additive threshold, this may be indicative of an empty bulk reservoir 158. Accordingly, the bulk flush operation may be terminated as its purpose has been fulfilled. Notably, method 200 may result in the performance of a bulk flush operation in an efficient manner that does not waste water, that completely drains bulk reservoir 158, and does not rely on a fixed bulk flush time period.

Notably, method 200 may further include steps for ensuring that the bulk flush operation is not terminated too early. For example, method 200 may further include determining that the additive content exceeds the predetermined additive threshold, e.g., indicating that wash additive is still present within bulk reservoir 158. For example, referring now specifically to FIG. 6, the flow of wash fluid 178 has numerous bubbles and is not particularly clear, which may be indicative of wash additive within the flow of wash fluid 178, thus indicating that bulk reservoir 158 is not yet empty and that the bulk flush operation should continue. Accordingly, when the additive content exceeds the predetermined additive threshold, method 200 may include continuing the bulk flush operation by operating the water supply to provide the flow of wash fluid in the bulk dispenser to dispense the wash additive.

Notably, method 200 may further be used to identify issues with the wash fluid dispensing assembly. For example, method 200 may include analyzing the one or more images using the image recognition process to determine that the flow rate of the flow of wash fluid falls below a flow rate threshold. In this regard, if the flow rate of wash fluid is too low when water control valve 172 is open, this may indicate an issue with the water supply source or the valve itself. For example, referring now specifically to FIG. 5, the image shows little to no water being dispensed through discharge nozzle 176, this may indicate an issue with the dispensing assembly that must be addressed by the user. Accordingly, method 200 may include providing a user notification that there is a fault condition with the water supply. It should be appreciated that this user notification may be provided using control panel 150 or via communication with a remote device, e.g., such as external device 192.

Method 200 may further include providing a user notification that the bulk dispensing take is empty. For example, terminating the bulk flush operation may include stopping the flow of wash fluid, stopping the addition of wash additive, and providing a user notification so that they may refill the tank, clean the tank, or perform some other action. It should be appreciated that this user notification may be provided via control panel 150 or through a remote device, e.g., such as external device 192.

Figure 8:
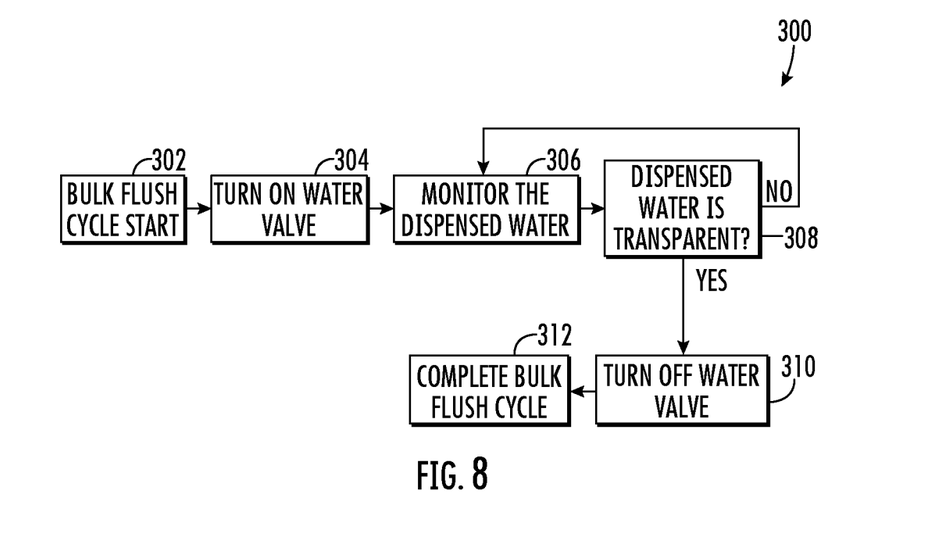
FIG. 8 provides a flow diagram of an exemplary process for implementing a bulk dispenser diagnostic method in a washing machine appliance according to an exemplary embodiment of the present subject matter.

Referring now briefly to FIG. 8, an exemplary flow diagram of a bulk flush operation method 300 that may be implemented by washing machine appliance 100 will be described according to an exemplary embodiment of the present subject matter. According to exemplary embodiments, method 300 may be similar to or interchangeable with method 200 and may be implemented by controller 156 of washing machine appliance 100. As shown, at step 302, controller 156 may first initiate a bulk flush cycle. Step 304 may include turning on a water valve, e.g., such as water control valve 172. Step 304 may further include opening suction valve 174 such that the flow of wash fluid 178 will have a tendency to draw in wash additive through suction line 168.

Step 306 may include monitoring the dispensed water, e.g., by obtaining one or more images using a camera assembly. As explained above, camera assembly 180 of washing machine appliance 100 or a remote camera assembly, e.g., mounted to external device 192, may be used to provide the images of the flow of wash fluid 178. Step 308 may generally include determining whether the flow of wash fluid is transparent, semitransparent, opaque, bubbly, or has any other condition indicative of the presence or absence of wash additive. If step 308 results in a determination that the wash fluid is not transparent (e.g., indicating that wash additive is present) method 300 may proceed back to 306 and the wash fluid may continually be monitored. By contrast, if step 308 results in a determination that the water is transparent, this may indicate that wash additive is no longer present and that bulk reservoir 158 is empty. Accordingly, step 310 may include terminating the bulk flush operation by turning off water control valve 172 and completing the bulk flush cycle at step 312, e.g., by notifying a user that the bulk flush operation has been completed.

FIGS. 4 and 8 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using washing machine appliance 100 as an example, it should be appreciated that this method may be applied to the operation of any suitable laundry appliance, such as another washing machine appliance.

As explained herein, aspects of the present subject matter are generally directed to a top load washer including a bulk dispensing system and a method of performing a bulk reservoir flush operation. This system and method provide a means to a consumer to flush out their bulk detergent tank if they desire to change detergents or clean the system. Conventional bulk flush operations may include performing a bulk flush for a predefined time, e.g., 30 minutes, without any feedback. Aspects of the present subject matter may utilize a camera and image recognition (e.g., including artificial intelligence analysis methods) to observe water injected into the washer after being routed to the bulk dispenser. The images can be used to differentiate between soapy water and clean water. Therefore, the bulk flush operation may run until pure water (e.g., with no detergent mixed) is detected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
    a wash tub positioned within a cabinet;
    a wash basket rotatably mounted within the wash tub and defining a wash chamber configured for receiving a load of clothes;
    a water supply configured to selectively dispense a flow of wash fluid through a discharge nozzle into the wash tub;
    a bulk dispenser for selectively adding a wash additive to the flow of wash fluid;
    a camera assembly mounted within the cabinet above the wash chamber and faces the discharge nozzle to monitor the flow of wash fluid; and
    a controller operably coupled to the water supply, the bulk dispenser, and the camera assembly, the controller being configured to:
        initiate a bulk flush operation by operating the water supply to provide the flow of wash fluid and the bulk dispenser to dispense the wash additive;
        obtain one or more images of the flow of wash fluid using the camera assembly before the wash fluid reaches the load of clothes;
        analyze the one or more images using an image recognition process to determine an additive content of the flow of wash fluid;
        determine that the additive content falls below a predetermined additive threshold; and
        terminate the bulk flush operation in response to determining that the additive content falls below the predetermined additive threshold.

2. The washing machine appliance of claim 1, wherein the controller is further configured to:
    determine that the additive content exceeds the predetermined additive threshold; and
    continue the bulk flush operation by operating the water supply to provide the flow of wash fluid and the bulk dispenser to dispense the wash additive.

3. The washing machine appliance of claim 1, wherein the controller is further configured to:
    analyze the one or more images using the image recognition process to determine that a flow rate of the flow of wash fluid falls below a flow rate threshold; and
    provide a user notification that there is a fault condition with the water supply.

4. The washing machine appliance of claim 1, wherein terminating the bulk flush operation comprises stopping the flow of wash fluid using the water supply and stopping the dispensing of the wash additive using the bulk dispenser.

5. The washing machine appliance of claim 1, wherein terminating the bulk flush operation comprises providing a user notification that a bulk dispensing tank is empty.

6. The washing machine appliance of claim 5, further comprising:
    a user interface panel, wherein the user notification is provided through the user interface panel.

7. The washing machine appliance of claim 5, wherein the controller is in operative communication with a remote device through an external network, and wherein the user notification is provided through the remote device.

8. The washing machine appliance of claim 1, wherein the image recognition process is a machine learning image recognition process comprising at least one of a convolution neural network ("CNN"), a region-based convolution neural network ("R-CNN"), a deep belief network ("DBN"), or a deep neural network ("DNN") image recognition process.

9. The washing machine appliance of claim 1, wherein the controller is in operative communication with a remote device through an external network, wherein the remote device comprises the camera assembly.

10. The washing machine appliance of claim 1, wherein the washing machine appliance is a vertical axis washing machine appliance.

11. A method of operating a washing machine appliance, the washing machine appliance comprising a wash basket rotatably mounted within a wash tub and defining a wash chamber configured for receiving a load of clothes, a water supply configured to selectively dispense a flow of wash fluid through a discharge nozzle into the wash tub, and a bulk dispenser for selectively adding a wash additive to the flow of wash fluid, the method comprising:
  initiating a bulk flush operation by operating the water supply to provide the flow of wash fluid and the bulk dispenser to dispense the wash additive;
  obtaining one or more images of the flow of wash fluid using a camera assembly, the camera assembly being mounted to face the discharge nozzle to monitor the flow of wash fluid before the wash fluid reaches the load of clothes;
  analyzing the one or more images using an image recognition process to determine an additive content of the flow of wash fluid;
  determining that the additive content falls below a predetermined additive threshold; and
  terminating the bulk flush operation in response to determining that the additive content falls below the predetermined additive threshold.

12. The method of claim 11, further comprising:
  determining that the additive content exceeds the predetermined additive threshold; and
  continuing the bulk flush operation by operating the water supply to provide the flow of wash fluid and the bulk dispenser to dispense the wash additive.

13. The method of claim 11, further comprising:
  analyzing the one or more images using the image recognition process to determine that a flow rate of the flow of wash fluid falls below a flow rate threshold; and
  providing a user notification that there is a fault condition with the water supply.

14. The method of claim 11, wherein terminating the bulk flush operation comprises stopping the flow of wash fluid using the water supply and stopping the dispensing of the wash additive using the bulk dispenser.

15. The method of claim 11, wherein terminating the bulk flush operation comprises providing a user notification that a bulk dispensing tank is empty.

16. The method of claim 11, wherein the image recognition process is a machine learning image recognition process comprising at least one of a convolution neural network ("CNN"), a region-based convolution neural network ("R-CNN"), a deep belief network ("DBN"), or a deep neural network ("DNN") image recognition process.

17. The method of claim 11, wherein the washing machine appliance is in operative communication with a remote device through an external network, wherein the remote device comprises the camera assembly.

\* \* \* \* \*